US011036846B2

(12) United States Patent
Sugano (10) Patent No.: US 11,036,846 B2
(45) Date of Patent: Jun. 15, 2021

(54) CONTROL DEVICE (71) Applicant: DENSO CORPORATION, Kariya (JP)

(72) Inventor: Yasuharu Sugano, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/540,997

(22) Filed: Aug. 14, 2019

(65) Prior Publication Data
US 2019/0370455 A1 Dec. 5, 2019

Related U.S. Application Data (63) Continuation of application No. PCT/JP2018/003733, filed on Feb. 5, 2018.

(30) Foreign Application Priority Data

Mar. 16, 2017 (JP) .............................. JP2017-050995

(51) Int. Cl.
G06F 13/00 (2006.01)
G06F 21/44 (2013.01)
H04L 9/08 (2006.01)

(52) U.S. Cl.
CPC ............. *G06F 21/44* (2013.01); *H04L 9/088* (2013.01)

(58) Field of Classification Search
CPC ............. G06F 21/44; G06F 2221/2129; G06F 12/1408; G06F 21/75; G06F 21/755; H04L 2209/84; H04L 63/0876; H04L 9/088
See application file for complete search history.

(56) References Cited

U.S. PATENT DOCUMENTS

| 6,788,189 | B2 * | 9/2004 | Kikkawa | B60R 25/04 307/10.2 |
| 2004/0128523 | A1 * | 7/2004 | Fujioka | G06F 21/72 713/189 |
| 2006/0115085 | A1 * | 6/2006 | Iwamura | H04L 9/0822 380/259 |
| 2014/0040992 | A1 | 2/2014 | Koide et al. | |
| 2014/0334300 | A1 * | 11/2014 | Horihata | H04L 12/12 370/230 |
| 2015/0291128 | A1 * | 10/2015 | Satake | B60R 25/34 340/5.65 |
| 2016/0173530 | A1 * | 6/2016 | Miyake | H04L 67/12 726/3 |
| 2017/0078884 | A1 * | 3/2017 | Tanabe | H04L 63/0876 |

(Continued)

FOREIGN PATENT DOCUMENTS

| CA | 2920386 A1 * | 5/2013 | ............. G06F 21/44 |
| JP | 2003255831 A | 9/2003 | |
| JP | 2004213216 A | 7/2004 | |

(Continued)

*Primary Examiner* — Farid Homayounmehr
*Assistant Examiner* — Lizbeth Torres-Diaz
(74) *Attorney, Agent, or Firm* — Harness, Dickey & Pierce, P.L.C.

(57) ABSTRACT

A control device in a vehicle: determines whether the control device is detached from the vehicle; communicates with other control devices mounted in the vehicle; stores an encryption key; performs a calculation process necessary for communication; and prohibits execution of the calculation process using the encryption key when determining that the control device is detached from the vehicle.

11 Claims, 6 Drawing Sheets

(56) References Cited

U.S. PATENT DOCUMENTS

2019/0370455 A1* 12/2019 Sugano ................. G06F 21/755
2020/0151972 A1* 5/2020 Nakajima ........... G06F 16/9035

FOREIGN PATENT DOCUMENTS

| JP | 2004359036 A | * | 12/2004 |
| JP | 2005341528 A | | 12/2005 |
| JP | 2009277085 A | | 11/2009 |
| JP | 2013131868 A | | 7/2013 |
| JP | 5310761 B2 | | 10/2013 |

* cited by examiner

CONTROL DEVICE

CROSS REFERENCE TO RELATED APPLICATION

The present application is a continuation application of International Patent Application No. PCT/JP2018/003733 filed on Feb. 5, 2018, which designated the U.S. and claims the benefit of priority from Japanese Patent Application No. 2017-50995 filed on Mar. 16, 2017. The entire disclosures of all of the above applications are incorporated herein by reference.

TECHNICAL FIELD

The present disclosure relates to a control device mounted on a vehicle.

BACKGROUND

A plurality of control devices are mounted on the vehicle. Examples of such control devices include an engine ECU for controlling the operation of the engine, an air conditioning ECU for controlling the operation of the air conditioner, and the like. Each control device performs a process necessary for the control performed by itself while communicating with another control device mounted on the same vehicle.

Along with the rapid development of information and communication technology in recent years, concerns have been raised that malicious persons control the vehicle from outside or steal information from the control device. In order to prevent this, application of MAC (Message Authentication Code) and encryption etc. are studied for communication between a plurality of control devices. When the information encrypted with the encryption key is transmitted and received between the control devices, it is possible to reduce the risk of occurrence of the above situation as compared with the configuration in which the information is transmitted and received in plaintext. A specific method for encrypting communication between devices has been proposed.

SUMMARY

According to an example embodiment, a control device in a vehicle: determines whether the control device is detached from the vehicle; communicates with other control devices mounted in the vehicle; stores an encryption key; performs a calculation process necessary for communication; and prohibits execution of the calculation process using the encryption key when determining that the control device is detached from the vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

As a key decryption method, a fault attack (i.e., failure application attack) is known. The fault attack is an attack method for stealing the encryption key stored in the device by applying a physical stress such as heat or electromagnetic waves to the device as an attacking target so as to induce erroneous calculation and by analyzing a calculation result or the like generated by the erroneous calculation.

In a conventional device, it is difficult to analyze the encryption key when a fault attack is performed, by adopting a special encryption processing algorithm. In addition, when it is detected that the ambient temperature falls outside the predetermined range, execution of the encryption processing or the like is prohibited, thereby preventing the encryption key from being stolen.

However, the countermeasure as described in the conventional device requires adoption of a special encryption algorithm in all control devices, and is not universal. In addition, the countermeasure as described in the conventional device is not universal because the countermeasure has no effect on an attack method that applies stress other than heat.

As another countermeasure against the fault attack, it is conceivable to construct a control device using expensive hardware having tamper resistance. However, since the vehicle is equipped with a large number of control devices, if such measures are applied to all the control devices, the cost of the vehicle will increase.

Thus, a control device is provided with preventing an encryption key from being stolen by a fault attack without being limited to a specific algorithm or a specific attack method.

In an aspect of an example embodiment, a control device mounted in a vehicle includes: a determination unit that determines whether the control device is detached from the vehicle; a communication unit that communicates with other control devices mounted in the vehicle; a memory that stores an encryption key; a calculation unit that performs calculation process necessary for communicating by the communication unit; and a prohibition unit that prohibits execution of the calculation process using the encryption key among calculation processes performed by the calculation unit when the determination unit determines that the control device is detached from the vehicle.

When a fault attack is performed, the control device as an attacking target is detached from the vehicle and placed in a special environment provided with a heating device or the like. Therefore, in the control device having the above-described configuration, when the determination unit determines that the control device is detached from the vehicle, execution of the calculation process using the encryption key is prohibited.

As a result, in a situation where a fault attack is performed (that is, in a situation where the control device is detached from the vehicle), at least the calculation process using the encryption key is not executed. Therefore, even when a fault attack is attempted, by not giving incorrect calculation information necessary for analyzing the encryption key to an attacker, it is surely prevented the encryption key from being stolen.

Therefore, a control device capable of preventing an encryption key from being stolen by a fault attack without limiting to a specific algorithm or an attack method is provided.

The configuration of a control apparatus 100 according to a first embodiment will be described with reference to FIG. 1. The control device 100 is configured as one of a plurality of control devices mounted in a vehicle (not shown). The plurality of control devices are, for example, an engine ECU and an air-conditioning ECU, but the type of the control device is not particularly limited here.

Hereinafter, among the plurality of control devices mounted in the above-described vehicle, the devices other than the control device 100 are referred to as "control devices 200". In the following, the configuration and functions of the control device 100 will be described in detail, but each control device 200 also has the same configuration and function as the control device 100.

The control device 100 is configured as a computer system including a CPU, a ROM, a RAM, and the like. The control device 100 is connected to another control device 200 via an in-vehicle network such as CAN, for example, and is capable of bidirectional communication with each control device 200.

The control device 100 includes, as functional control blocks, a communication unit 110, a calculation unit 120, a determination unit 130, prohibition unit 140, an authentication unit 150, and a memory 160.

The communication unit 110 is a portion for providing an interface for communicating with another control device 200. Data transmitted and received in the communication is encrypted with an encryption key.

The calculation unit 120 is a portion that performs a calculation process necessary for the communication. This calculation process includes a process of preliminarily encrypting data transmitted from the communication unit 110 to the control device 200 using an encryption key and a process of decrypting data received by the communication unit 110 from the control device 200 using an encryption key.

The above calculation process also includes a process without using encryption keys. Such process includes, for example, a process of creating self-diagnostic information indicating whether each part of the vehicle is operating normally and delivering the information to the communication unit 110 in plaintext.

The determination unit 130 is a unit for determining whether the control device 100 is detached from the vehicle. The concrete determination method will be described later.

The prohibition unit 140 is a portion that prohibits a part of various calculation processes performed by the calculation unit 120, specifically, a process that is performed using an encryption key.

The authentication unit 150 performs the authentication process with the control device 200 by communicating with another control device 200 via the communication unit 110. This "authentication process" is a process for confirming whether the control device 200 as a communication partner is a proper one. As a method of such authentication process, for example, a known method such as challenge response authentication may be adopted. In this case, it is assumed that information such as a specific algorithm and a key for response generation is shared in advance between the control device 100 and the control device 200.

The memory 160 is a portion for storing an encryption key, a log, and the like, and is, for example, a nonvolatile memory. When the calculation unit 120 performs the calculation process using the encryption key, the calculation unit 120 reads out in advance the necessary encryption key from the memory 160.

Figure 1:
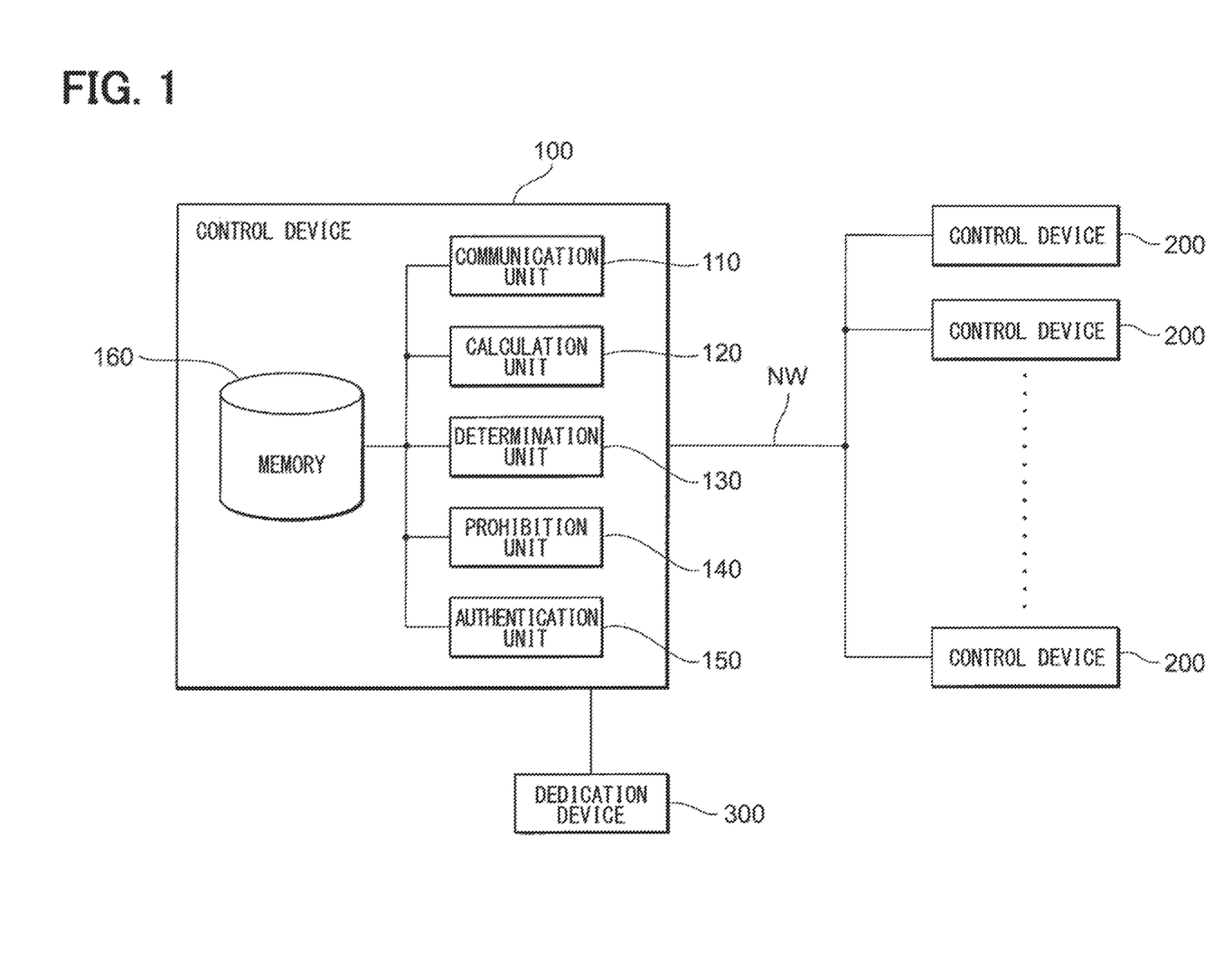
FIG. 1 is a diagram schematically showing a configuration of a control device according to a first embodiment.

The dedicated device 300 shown in FIG. 1 is, for example, a maintenance tool used by a mechanic of the vehicle. When maintenance of the vehicle is performed, the dedicated device 300 is connected to the control device 100, and communication is performed between the dedicated device 300 and the control device 100. Incidentally, the dedicated device 300 is shown in FIG. 1 for convenience of explanation. In a normal state other than maintenance, the dedicated device 300 is in a detached state.

Figure 2:
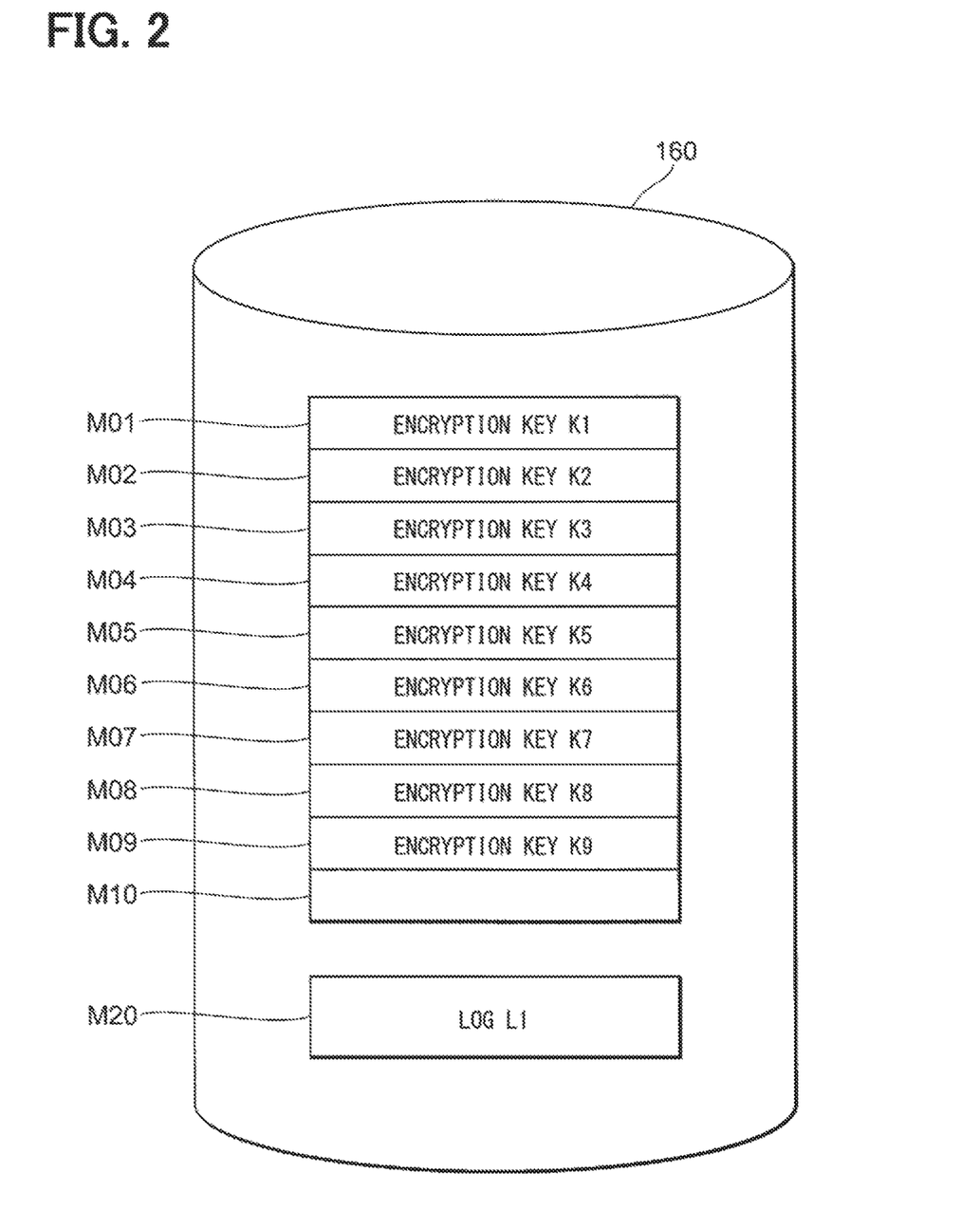
FIG. 2 is a diagram schematically showing information stored in a memory.

Information stored in the memory 160 will be described with reference to FIG. 2. As shown in the drawing, ten key storage units (M01 to M10) are formed as storage areas of information in the memory 160. Each key storage unit M01 and the like is the area for storing the encryption key used for the calculation process performed by the calculation unit 120. In FIG. 2, the encryption keys stored in each of the key storage units M01, M02, . . . M09 are shown as encryption keys K1, K2, . . . K9.

In order to prevent the control device 100 from being externally controlled by a malicious person and to prevent the information from being stolen, the encryption key stored in each of the key storage unit M01 and the like can not be read out from the outside.

It should be noted that no encryption key is stored in the tenth key storage unit M10, and the storage area of the unit M10 is empty. As will be described later, the key storage unit M10 is a portion into which an encryption key for checking the operation is written at the time of maintenance.

In the memory 160, in addition to the above units, a log storage unit M20 is also formed. The log storage unit M20 is a storage area for storing the log L1. For example, when any abnormality occurs in the vehicle, the information indicating the occurrence of the abnormality is added to the log L1.

Meanwhile, a fault attack is known as one of attack methods for communication protected by encryption. The fault attack is an attack method for stealing the encryption key stored in the device by applying a physical stress such as heat or electromagnetic waves to the device as an attacking target so as to induce erroneous calculation and by analyzing a calculation result or the like generated by the erroneous calculation. When the fault attack as described above is performed on the control device 100 while the calculation unit 120 is performing the calculation process using the encryption key, the encryption key may be stolen.

Therefore, in the control device 100 according to the present embodiment, by executing the process to be described below, it is prevented that the encryption key is stolen by a fault attack.

Figure 3:
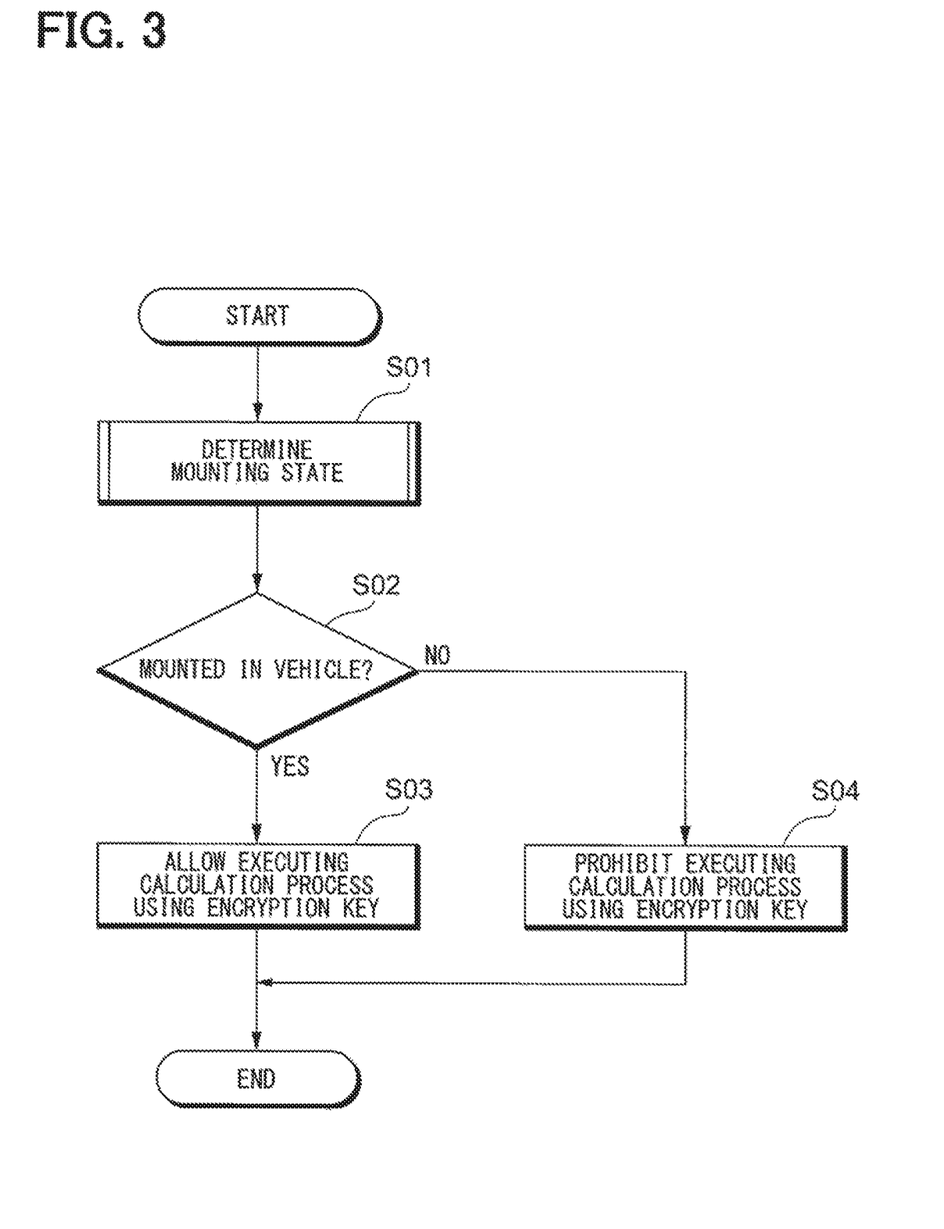
FIG. 3 is a flowchart showing a flow of a process executed by a control device.

The series of the process shown in FIG. 3 is executed when power supply to the control device 100 is started, for example, by turning on the ignition switch of the vehicle. In the first step S01 of the process, the determination unit 130 determines whether the control device 100 is mounted in the vehicle. The concrete contents of the process will be described later with reference to FIG. 4.

When the control device 100 is not detached from the vehicle and is mounted in the vehicle, the process proceeds to step S03 via step S02. In step S03, execution of the calculation process using the encryption key is permitted. This step is performed by the prohibition unit 140. After that, the calculation unit 120 can perform the calculation process using the encryption key without limitation.

When it is determined in step S01 that the control device 100 is detached from the vehicle, the process proceeds to step S04 via step S02. In step S04, execution of the calculation process using the encryption key is prohibited. This step is performed by the prohibition unit 140. Thereafter, the calculation unit 120 cannot perform the calculation process using the encryption key. In this case, for example, some alternative process may be performed such as changing to send and receive plaintext data without encryption.

In step S04, as described above, the calculation process using the encryption key is prohibited, but the calculation process without using the encryption key may not be prohibited.

Incidentally, prohibition in step S04 is applied to the calculation process using the encryption keys stored in each of the key storage units M01, M02, . . . M09. As will be described later, when the encryption key is written in the key storage unit M10, the prohibition unit 140 does not prohibit the calculation process using this encryption key.

As described above, when the determination unit 130 determines that the control device 100 is detached from the vehicle, the prohibition unit 140 prohibits the calculation process using the encryption key among the calculation processes performed by the calculation unit 120.

In this case, "the calculation process using an encryption key" broadly includes generation and verification of a signature, and generation and verification of a message authentication code (MAC) in addition to data encryption and decryption. In other words, the "encryption key" described here does not mean only a narrow sense encryption key used only for encryption and decryption for secrecy of data, but a broad sense encryption key including a key for creating data (e.g., message authentication code) for indicating the completeness of information, for example.

When a fault attack is performed on the control device 100, the control device 100 is removed from the vehicle and placed in a special environment provided with a heating device or the like. In the present embodiment, as described above, when the determination unit 130 determines that the control device 100 is detached from the vehicle, execution of calculation process using the encryption key is prohibited.

As a result, in a situation where a fault attack is performed (that is, in a situation where the control device 100 is detached from the vehicle), at least the calculation process using the encryption key is not executed. Therefore, it is surely prevented that the encryption key is stolen by the fault attack.

Counter measures against such fault attacks do not require special algorithms in process using encryption keys. In addition, it can address not only specific types of fault attacks, but also all kinds of fault attacks.

More concrete contents of the process executed in step S01 among the series of process shown in FIG. 3 will be described with reference to FIG. 4. Among the series of processes shown in FIG. 4, processes other than steps S17 and S20 are performed by the authentication unit 150. Steps S17 and S20 are performed by the determination unit 130.

In the present embodiment, the authentication process is performed between the control device 100 and one or a plurality of control devices 200, and based on the authentication result, it is determined whether the control device 100 is mounted in the vehicle.

In the first step S11, setting of the number of authentication devices is performed. The number of devices to be authenticated is the number of devices (hereinafter also referred to as "the authentication target devices") selected as the objects of the above-described authentication process in the control device 200. Here, the total number of control devices 200 mounted in the vehicle is defined as N. The number randomly selected from the range from 1 to N or the range from the threshold value determined by the system to N is set as the number of authentication devices.

In step S12 following step S11, selection of the authentication target device is performed. In this case, the authentication target devices having the number equal to the above-mentioned number of authentication devices is randomly selected among the control devices 200 mounted in the vehicle.

The control device 200 used as the authentication target device may be changed each time as described above. Alternatively, the same control device 200 (i.e., one or a plurality of control devices) may be always used as the authentication target device. In this case, the process of steps S11 and S12 is not performed under a condition that the number of authentication devices is a fixed value.

In step S13 subsequent to step S12, the authentication process is performed between one of the authentication target devices and the control device 100. In step S14 subsequent to step S13, it is determined whether the above authentication process is performed normally (that is, whether the authentication result is proper or improper). When the authentication process is performed normally, that is, when it is confirmed that the authentication target device is the proper control device 200, the process proceeds to step S15.

In step S15, it is determined whether the authentication process in step S13 is performed for all the authentication target devices. In other words, it is determined whether the process of steps S13 and S14 is executed the same number of times as the above-described number of authentication devices. When the authentication process is not performed for all the authentication target devices, the process after step S13 is executed again. In step S13, an authentication process is performed on an authentication target device different from the previous time.

In step S15, when the authentication process is performed for all the authentication target devices, the process proceeds to step S16. The fact that the process is shifted to step S16 means that all the authentication processes performed with each of the authentication target devices are performed normally.

In step S16, the value of the authentication failure flag is set as zero. The authentication failure flag is a variable whose value is set to one when the authentication process is not performed normally with any of the authentication target devices. In step S17 following step S16, the determination unit 130 determines that the control device 100 is mounted in the vehicle.

When the authentication process is not normally performed in step S14, that is, when it is confirmed that the authentication target device is not the proper control device 200, the process proceeds to step S18. In step S18, information indicating that the authentication process is failed is added to the log L1.

In step S19 following step S18, the value of the authentication failure flag is set as one. In step S20 following step S19, the determination unit 130 determines that the control device 100 is removed from the vehicle.

As described above, in the present embodiment, the authentication unit 150 selects at least one of the other control devices 200 mounted in the vehicle as the authentication target device, and performs the authentication process with all the selected authentication target devices. Thereafter, when any one of the authentication processes is not performed normally, the determination unit 130 determines that the control device 100 is in a detached state from the vehicle. Since the above determination is made based on the result of the authentication process performed with the other control device 200, for example, when a fault attack on the control device 100 is performed in an environment simulating the inside of the vehicle, the possibility that the determination unit 130 makes an erroneous determination that the vehicle is mounted in the vehicle can be reduced.

The authentication unit 150 according to the present embodiment randomly sets the number of authentication devices (step S11). Further, the authentication unit 150 randomly selects the authentication target device among the other control devices 200 mounted in the vehicle (at step S12). For this reason, it is more difficult to create an environment simulating the inside of the vehicle and to cause the determination unit 130 to make an erroneous determination.

In the example explained above, the authentication unit 150 is configured to perform the authentication process when the power supply to the control device 100 is started. Instead of the above mode, the authentication unit 150 may perform the authentication process every time it is necessary to execute the process using the encryption key. In this case, the series of processes shown in FIG. 3 may be repeatedly executed each time it is necessary to execute the process using the encryption key. In order to reduce the process load required for the authentication process, it is preferable that the authentication process is executed when the power supply to the control device is started as in this embodiment.

Alternatively, the frequency of execution of the process shown in FIG. 3 may be changed in accordance with the value of the authentication failure flag. For example, when the value of the authentication failure flag is 0, the process shown in FIG. 3 may be performed only when the power supply is turned on as in this embodiment, and when the value of the authentication failure flag is 1, the process shown in FIG. 3 may be performed each time the predetermined period has elapsed. This makes it more difficult to steal the key by the fault attack.

Further, when the value of the authentication failure flag is 1, the process shown in FIG. 3 may be performed twice or more at the time of turning on the power supply or the like. Since the determination whether the control device 100 is mounted in the vehicle is repeated twice or more while changing the authentication target device, it is more difficult to steal the key due to the fault attack.

Figure 5:
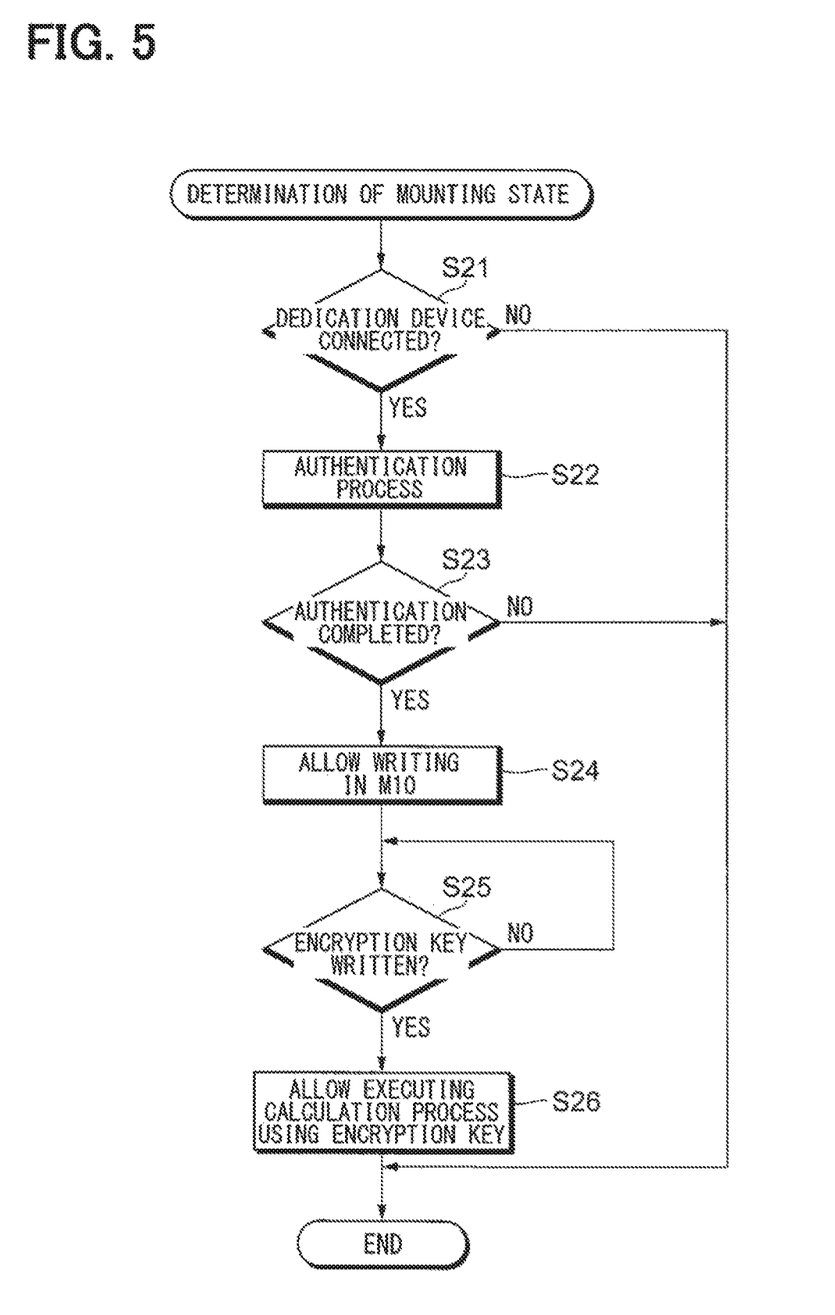
FIG. 5 is a flowchart showing a flow of a process executed by a control device.

With reference to FIG. 5, the contents of the process executed by the control device 100 when the dedicated device 300 is connected will be described.

In the first step S21, it is determined whether the dedicated device 300 is connected to the control device 100. When the dedicated device 300 is not connected, the series of the process shown in FIG. 5 is terminated. When the dedicated device 300 is connected, the process proceeds to step S22.

In step S22, an authentication process is performed between the dedicated device 300 and the control device 100. This authentication process is a process in which the control device 100 checks whether the connected dedicated device 300 is proper.

In step S23 subsequent to step S22, it is determined whether the above authentication process is performed normally (that is, whether the authentication result is proper or improper). When the authentication process is not performed normally, that is, when it is confirmed that the dedicated equipment 300 is not proper, the series of the process shown in FIG. 5 is terminated. When the authentication process is performed normally, that is, when it is confirmed that the dedicated device 300 is proper, the process goes to step S24.

In step S24, it is permitted that the dedicated device 300 writes a new encryption key in the key storage unit M10. In response to this, the dedicated device 300 writes a new encryption key in the key storage unit M10. This encryption key is, for example, an encryption key that is temporarily used for checking operation of the control device 100 or the like.

In step S25 subsequent to step S24, it is determined whether the writing of the encryption key by the dedicated device 300 is performed. When the writing of the encryption key is not yet performed, the process of step S25 is executed again. When it is confirmed that the encryption key is written, the process proceeds to step S26.

In step S26, it is permitted for the calculation unit 120 to perform the calculation process using the encryption key newly written in the key storage unit M10. This step is performed by the prohibition unit 140. After that, even when the control device 100 is detached from the vehicle and, as a result, the process of step S04 in FIG. 3 is performed, the calculation process using the newly written encryption key in the key storage unit M10 remains to be permitted.

As described above, even when the determination unit 130 determines that the control device 100 is removed from the vehicle after the new encryption key is written in the memory 160 by the dedicated device 300, the prohibition unit 140 does not prohibit the execution of the process using the new encryption key.

For this reason, for example, when a person having proper authority such as a mechanic detaches the control device 100 from the vehicle, it prevents such a situation that trouble occurs in maintenance because the usage of all the encryption keys is prohibited.

A second embodiment will be described. This embodiment is different from the first embodiment only in the mode of the process performed in step S11 of FIG. 4, that is, the mode of the process for setting the number of authentication devices. Hereinafter, only parts different from the first embodiment will be described, and description of parts common to the first embodiment will be omitted for explanation as appropriate.

Figure 4:
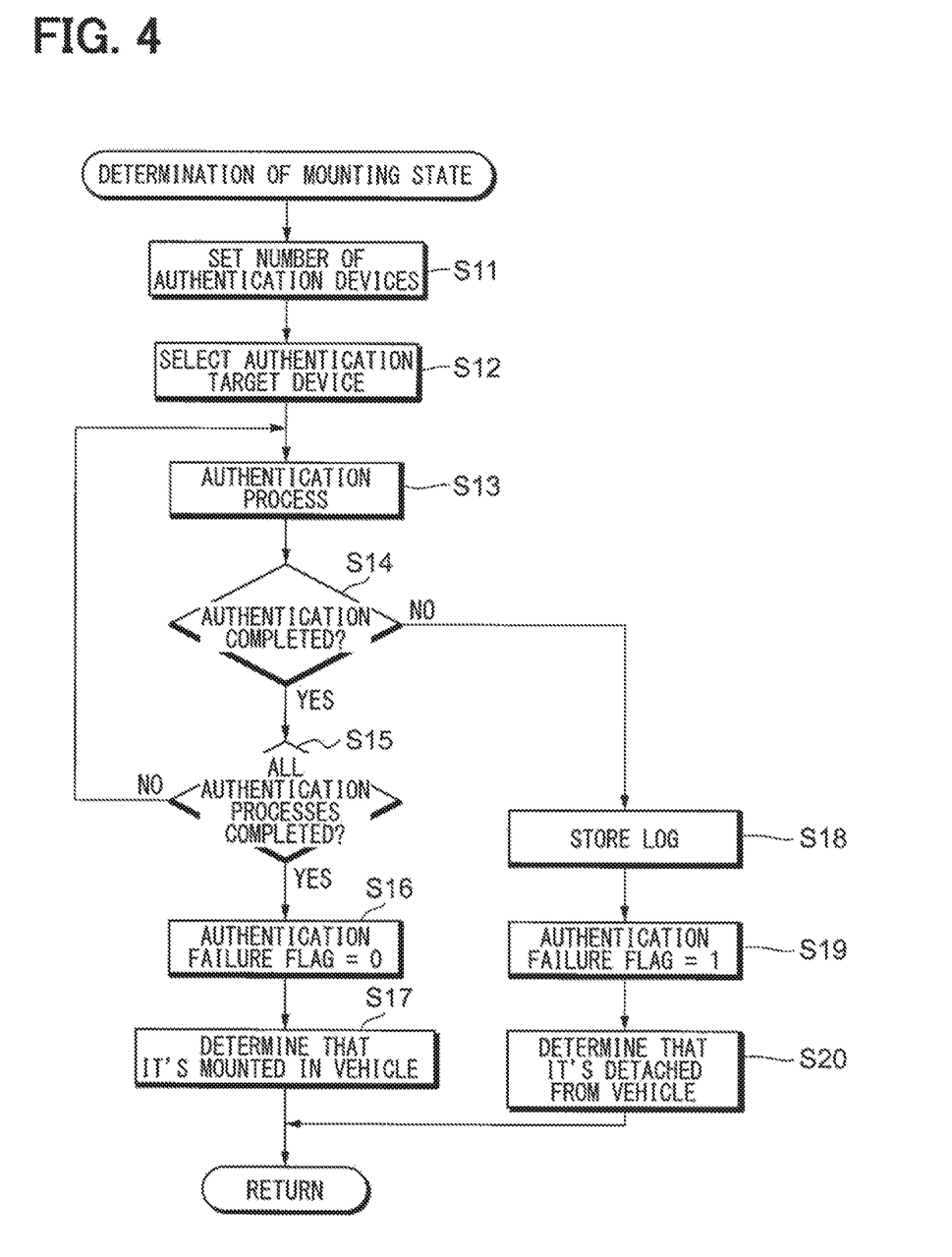
FIG. 4 is a flowchart showing a flow of a process executed by a control device.
Figure 6:
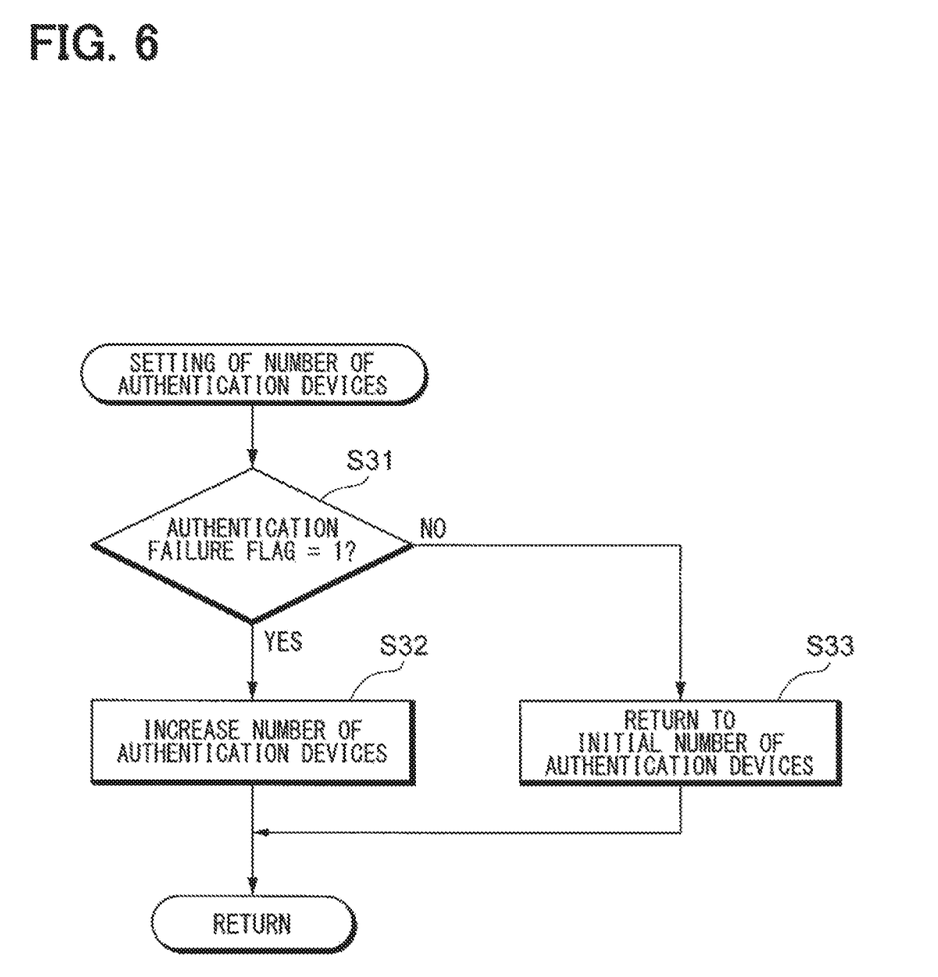
FIG. 6 is a flowchart showing a flow of a process executed by a control device according to a second embodiment.

The series of the process shown in FIG. 6 is a process executed by the authentication unit 150 instead of the process performed in step S11 of FIG. 4. In the present embodiment, the setting of the number of authentication devices is not performed randomly, but basically the same number as the preliminary set initial value (for example, 3) is set as the number of authentication devices.

In the first step S31, it is determined whether the value of the authentication failure flag is 1. When the value of the authentication failure flag is 1, the process proceeds to step S32. The fact that the process is shifted to step S32 means that the control device 100 is detached from the vehicle when the previous authentication process is completed. For this reason, there is a possibility that the control device 100 is not mounted in the vehicle at the present time, and is being attacked by a malicious person.

Therefore, in step S32, a process of increasing the number of authentication devices is performed. As described above, in the present embodiment, when any one of the authentication processes performed with the authentication target device is not performed normally (in the case where the value of the authentication failure flag is 1), the authentication unit 150 increases the number of authentication target devices to be selected in the next and subsequent times.

Since the number of authentication devices to be set is a value larger than the initial value, the authentication process is performed under more strict conditions. It is difficult to determine that the control device 100 is mounted in the vehicle, so the possibility of the key being stolen by the fault attack is further reduced.

In step S31, when the value of the authentication failure flag is 0, the process proceeds to step S31. The fact that the process is shifted to step S31 means that the control device 100 is mounted in the vehicle when the previous authentication process is completed. Therefore, in step S32, the process for returning the number of authentication devices to the initial value is performed.

Even with the above mode, the same effects as those described in the first embodiment are obtained.

In the above description, the determination performed by the determination unit 130, that is, the determination whether the control device 100 is removed from the vehicle is performed based on the result of the authentication process performed by the authentication unit 150. Alternatively, the determination unit 130 may perform the determination in a different manner from the above. For example, a switch for physically detecting that the control device 100 is detached from the vehicle is arranged, and, based on the state of the switch, the determination unit 130 may perform the determination whether the control device 100 is detached from the vehicle.

The present embodiments have been described with reference to specific examples above. However, the present disclosure is not limited to these specific examples. Those skilled in the art appropriately modifies design to these specific examples, which are also included in the scope of the present disclosure as long as they have the features of the present disclosure. The elements, the arrangement, the conditions, the shape, etc. of the specific examples described above are not limited to those examples and can be appropriately modified. The combinations of elements included in each of the above described specific examples can be appropriately modified as long as no technical inconsistency occurs.

Here, the process of the flowchart or the flowchart described in this application includes a plurality of sections (or steps), and each section is expressed as, for example, S01. Further, each section may be divided into several subsections, while several sections may be combined into one section. Furthermore, each section thus configured may be referred to as a device, module, or means.

Although the present disclosure has been described in accordance with the examples, it is understood that the present disclosure is not limited to such examples or structures. The present disclosure covers various modification examples and equivalent arrangements. In addition, while the various elements are shown in various combinations and configurations, which are exemplary, other combinations and configurations, including more, less or only a single element, are also within the spirit and scope of the present disclosure.

What is claimed is:

1. A control device mounted in a vehicle, comprising:
a memory configured to store an encryption key;
a processor configured to:
    determine whether the control device is detached from the vehicle;
    communicate with other control devices mounted in the vehicle;
    perform a calculation process necessary for communication; and
    prohibit execution of the calculation process using the encryption key among calculation processes performed by the processor when the memory is storing the encryption key and when the processor determines that the control device is detached from the vehicle;
    select at least one of the other control devices mounted in the vehicle as an authentication target device and perform an authentication process with all selected authentication target devices;
    determine that the control device is detached from the vehicle when the authentication process with any one of all selected authentication target devices is not performed normally;
wherein:
the processor does not prohibit at least a part of the calculation processes performed by the processor without using the encryption key; and
when the authentication process with the any one of all selected authentication target devices is not performed normally, the processor is configured to increase a numerical number of authentication target devices to be selected in a next time or subsequent times.

2. The control device according to claim 1, wherein: the processor is further configured to perform the authentication process when power supply to the control device is started.

3. The control device according to claim 1, wherein: the processor is further configured to randomly select the authentication target device from the other control devices mounted in the vehicle.

4. The control device according to claim 1, wherein: the processor is further configured to randomly set a numerical number of authentication target devices to be selected.

5. The control device according to claim 1, wherein: after a dedicated device writes a new encryption key in the memory, even when the processor determines that the control device is detached from the vehicle, the processor does not prohibit the execution of the calculation process using the encryption key.

6. A non-transitory computer readable medium having instructions stored therein, said instructions are executed by a processor to perform operations, comprising:
a memory that stores an encryption key; and
the processor configured to:
    determine whether a control device is detached from a vehicle;
    communicate with other control devices mounted in the vehicle;
    perform a calculation process necessary for communication; and
    prohibit execution of the calculation process using the encryption key when the memory is storing the encryption key and when determining that the control device is detached from the vehicle;
    select at least one of the other control devices mounted in the vehicle as an authentication target device and perform an authentication process with all selected authentication target devices;
    determine that the control device is detached from the vehicle when the authentication process with any one of all selected authentication target devices is not performed normally;
wherein:
the processor does not prohibit at least a part of calculation processes without using the encryption key; and when the authentication process with the any one of all selected authentication target devices is not performed normally, the processor is configured to increase a numerical number of authentication target devices to be selected in a next time or subsequent times.

7. A method for a control device mounted in a vehicle, comprising:
   a memory that stores an encryption key; and
   a processor configured to:
      determine whether the control device is detached from the vehicle;
      communicate with other control devices mounted in the vehicle;
      perform a calculation process necessary for communication;
      prohibit execution of the calculation process using the encryption key when determining that the control device is detached from the vehicle;
      select at least one of the other control devices mounted in the vehicle as an authentication target device and perform an authentication process with all selected authentic target devices;
      determine that the control device is detached from the vehicle when the authentication process with any one of all selected authentication target devices is not performed normally;
   wherein:
      the processor does not prohibit at least a part of calculation processes without using the encryption key; and
      when the authentication process with the any one of all selected authentication target devices is not performed normally, the processor is configured to increase a numerical number of authentication target devices to be selected in a next time or subsequent times.

8. The method for the control device according to claim 7, wherein the processor is further configured to perform the authentication process when power supply to the control device is started.

9. The method for the control device according to claim 8, wherein the processor is further configured to randomly select the authentication target device from the other control devices mounted in the vehicle.

10. The method for the control device according to claim 8, wherein the processor is further configured to randomly set a numerical number of authentication target devices to be selected.

11. The method for the control device according to claim 7, wherein after a dedicated device writes a new encryption key in the memory, even when the processor determines that the control device is detached from the vehicle, the processor does not prohibit the execution of the calculation process using the encryption key.

* * * * *